(12) United States Patent
Liu et al.

(10) Patent No.: US 10,757,424 B2
(45) Date of Patent: Aug. 25, 2020

(54) FLC-BASED IMAGE COMPRESSION METHOD AND DEVICE

(71) Applicant: REALTEK SEMICONDUCTOR CORPORATION, Hsinchu (TW)

(72) Inventors: Kai Liu, Taipei (TW); Wen-Tsung Huang, Chiayi (TW); Shih-Tse Chen, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/678,357

(22) Filed: Nov. 8, 2019

(65) Prior Publication Data

US 2020/0077102 A1  Mar. 5, 2020

Related U.S. Application Data

(62) Division of application No. 15/698,378, filed on Sep. 7, 2017.

(30) Foreign Application Priority Data

Dec. 12, 2016  (TW) .............................. 105141112 A (51) Int. Cl.
*H04N 19/176* (2014.01)
*G06T 9/00* (2006.01)
(Continued)

(52) U.S. Cl.
CPC ............. *H04N 19/176* (2014.11); *G06T 9/00* (2013.01); *G06T 9/007* (2013.01); *H04N 1/64* (2013.01);
(Continued)

(58) Field of Classification Search
CPC ........ H04N 19/176; H04N 19/48; H04N 1/64; H04N 19/91; H04N 19/186; H04N 1/646;
(Continued)

(56) References Cited

U.S. PATENT DOCUMENTS

| 8,594,441 B1 * | 11/2013 | King | H04N 19/124 |
| | | | 382/166 |
| 2012/0213435 A1 * | 8/2012 | Donovan | H04N 19/176 |
| | | | 382/166 |

(Continued)

FOREIGN PATENT DOCUMENTS

| TW | 200643820 | 12/2006 |
| TW | 201621810 | 6/2016 |

*Primary Examiner* — Amandeep Saini
(74) *Attorney, Agent, or Firm* — WPAT, PC (57) ABSTRACT

Fixed length code (FLC)-based image compression method and device are provided. The FLC-based image compression method for compressing a block containing multiple pixels includes the following steps: determining a first representative pixel and a second representative pixel from the pixels according to the pixel values of the pixels; generating, by interpolation, multiple interpolated pixels according to the first representative pixel and the second representative pixel; generating an index value for each of the pixels according to the first representative pixel, the second representative pixel, and the interpolated pixels; adjusting the first representative pixel and the second representative pixel to generate a first adjusted representative pixel and a second adjusted representative pixel; and using the index values and complete or quantized pixel values of the first adjusted representative pixel and the second adjusted representative pixel to represent the block.

12 Claims, 11 Drawing Sheets

(51) Int. Cl.
   *H04N 19/186* (2014.01)
   *H04N 1/64* (2006.01)
   *H04N 19/124* (2014.01)
   *H04N 19/182* (2014.01)
   *H04N 19/48* (2014.01)
   *H04N 19/91* (2014.01)

(52) U.S. Cl.
   CPC ........... *H04N 1/646* (2013.01); *H04N 19/124* (2014.11); *H04N 19/182* (2014.11); *H04N 19/186* (2014.11); *H04N 19/48* (2014.11); *H04N 19/91* (2014.11)

(58) Field of Classification Search
   CPC ...... H04N 19/124; H04N 19/182; G06T 9/00; G06T 9/007
   USPC ........................................................ 382/232
   See application file for complete search history.

(56) References Cited

U.S. PATENT DOCUMENTS

2015/0023416 A1\* 1/2015 Tanaka .................... H04N 19/85
                                                           375/240.08
2017/0078677 A1\* 3/2017 Park ..................... H04N 19/176

\* cited by examiner

FLC-BASED IMAGE COMPRESSION METHOD AND DEVICE

BACKGROUND

1. Field of the Disclosure

The present disclosure generally relates to image compression, and, more particularly, to a fixed length code (FLC)-based image compression method and a device thereof.

2. Description of Related Art

In multimedia applications, images are usually compressed to reduce the memory space for storage and/or the data bandwidth for transmission. Image compression technologies can be divided into two categories—variable length coding (VLC) and fixed length coding (FLC). Regarding the FLC, there is one technology known as texture compression that encodes/decodes image texture data, and S3 Texture Compression (S3TC) is one of the most common designs in such technology. S3TC mainly includes the following two steps: (1) cutting an image into several non-overlapping blocks with a fixed size; and (2) determining two representative pixels for each block, and generating an index value for each pixel within the block.

A method for determining the representative pixels is proposed in the U.S. Pat. No. 8,594,441. However, the representative pixels determined by this method cannot effectively represent all the pixels within the block, resulting in noticeable color shift in compressed images.

SUMMARY

In view of the issues of the prior art, an object of the present disclosure is to provide an image compression method and a device thereof for improving the quality of image compression, so as to make an improvement to the prior art.

An FLC-based image compression method is also provided. The FLC-based image compression method compresses a block containing multiple pixels, and includes the steps of: determining a first representative pixel and a second representative pixel from the pixels according to pixel values of the pixels; generating, by interpolation, multiple interpolated pixels according to the first representative pixel and the second representative pixel; generating an index value for each of the pixels according to the first representative pixel, the second representative pixel, and the interpolated pixels; adjusting the first representative pixel and the second representative pixel to generate a first adjusted representative pixel and a second adjusted representative pixel; and using the index values and complete or quantized pixel values of the first adjusted representative pixel and the second adjusted representative pixel to represent the block.

A fixed length code (FLC)-based image compression device for compressing a block containing multiple pixels. The fixed length code FLC-based image compression device includes a memory, a comparison circuit, and a calculation circuit. The memory stores multiple pixel values of the pixels. The comparison circuit is coupled to the memory and configured to determine a first representative pixel and a second representative pixel from the pixels according to the pixel values of the pixels. The calculation circuit is coupled to the memory and the comparison circuit for performing steps of: generating, by interpolation, multiple interpolated pixels according to the first representative pixel and the second representative pixel; generating an index value for each of the pixels according to the first representative pixel, the second representative pixel, and the interpolated pixels; adjusting the first representative pixel and the second representative pixel to generate a first adjusted representative pixel and a second adjusted representative pixel; and using the index values and complete pixel values or quantized pixel values of the first adjusted representative pixel and said second adjusted representative pixel to represent the block.

The image compression method and apparatus of the present disclosure determine a more appropriate representative pixel, or adjust the representative pixel to achieve better image compression quality. Compared with the traditional technologies, the image compression method and apparatus in the present disclosure can reduce color shift.

These and other objectives of the present disclosure no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events. The disclosures herein include an image compression and a device thereof. Some or all of the processes of the image compression method may be implemented by software and/or firmware, and can be performed by the image compression device or its equivalent.

Figure 1:
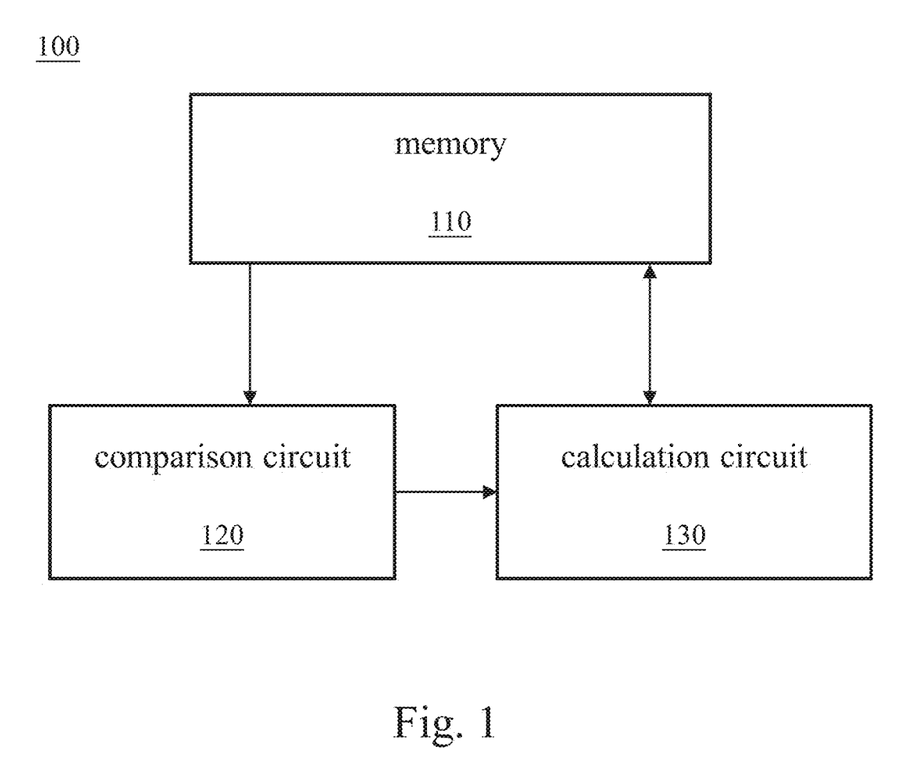
FIG. 1 illustrates a functional block diagram of a fixed-length coding (FLC)-based image compression device according to an embodiment of this disclosure.
Figure 2:
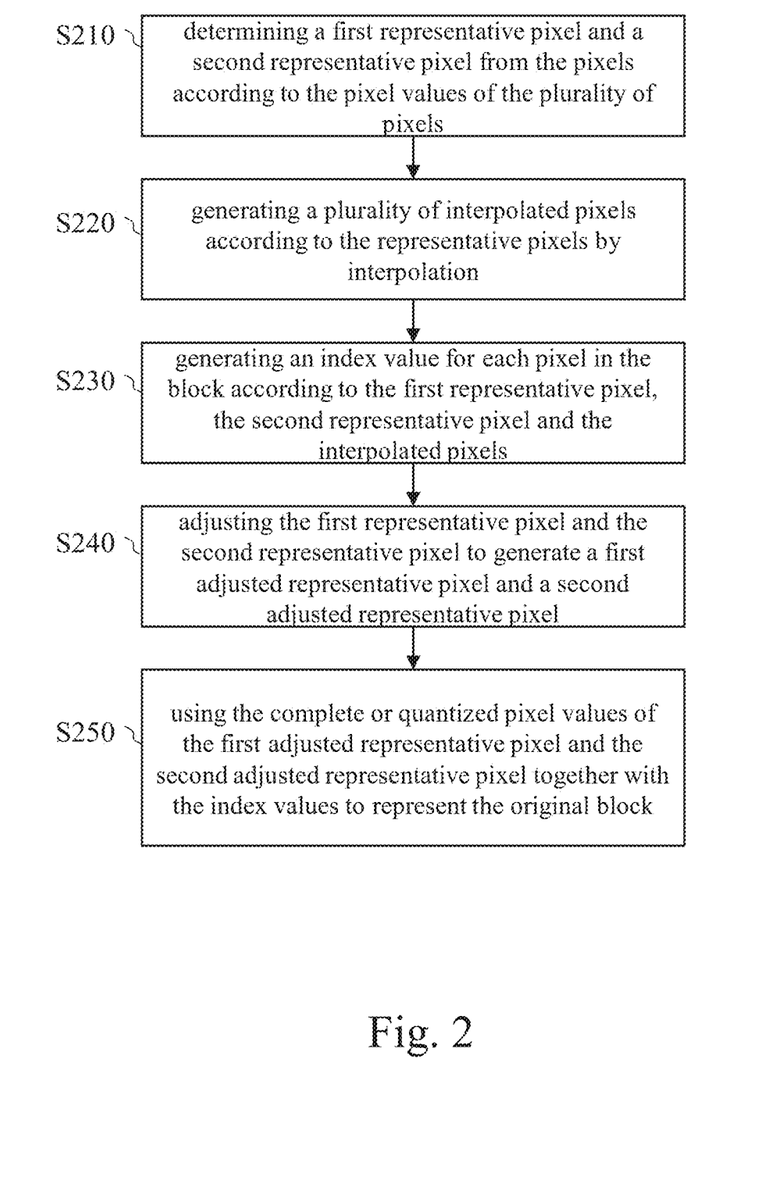
FIG. 2 illustrates a flow chart of a first FLC-based image compression method of this disclosure.
Figure 3:
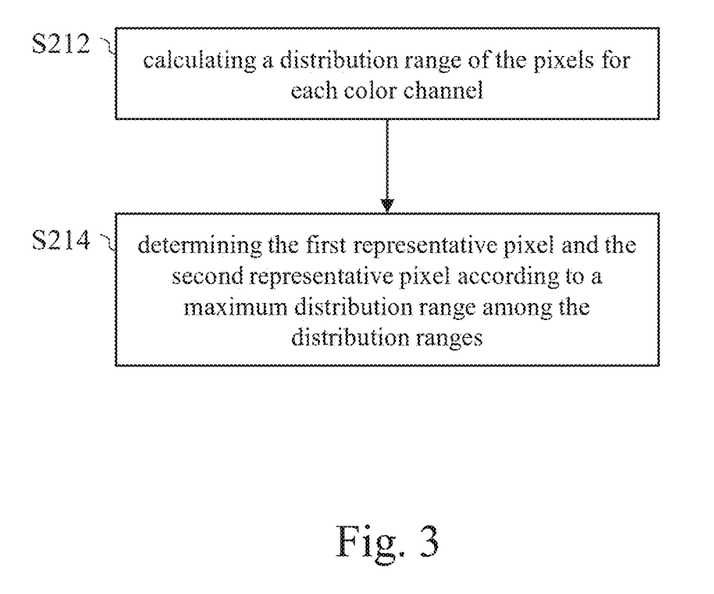
FIG. 3 illustrates a detailed flow of step S210.
Figure 4:
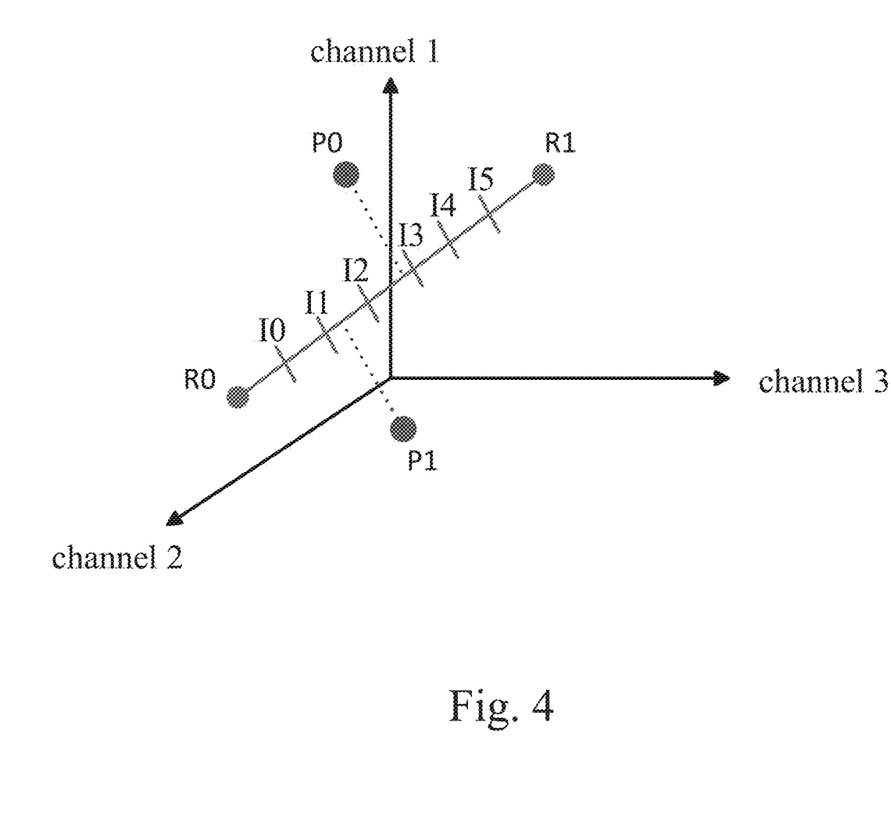
FIG. 4 illustrates an exemplary diagram of the representative pixels and the interpolated pixels in the color space for method one.

FIG. 1 is a functional block diagram of a fixed-length coding (FLC)-based image compression device according to an embodiment of this disclosure. The image compression device 100 includes a memory 110, a comparison circuit 120, and a calculation circuit 130. FIG. 2 is a flow chart of a first FLC-based image compression method of this disclosure. The memory 110 stores pixel values of pixels of an image. The comparison circuit 120 reads one block of the image from the memory 110 and determines a first representative pixel and a second representative pixel from the pixels according to the pixel values of the plurality of pixels of the block (step S210). More specifically (as shown in the detailed flow of FIG. 3), the comparison circuit 120 calculates a distribution range of the pixels for each color channel, e.g., R, G, and B; that is, the respective maximum and minimum values in the three channels of all the pixels in the block can be learned by comparison (step S212). For the RGB color space, the maximum and minimum values are a total of six values including the largest and smallest R values, the largest and smallest G values and the largest and smallest B values within the block, and the comparison circuit 120 further subtracts the minimum value from the maximum value in the same channel to obtain three differences (i.e., $R_{max}-R_{min}$, $G_{max}-G_{min}$, $B_{max}-B_{min}$) (step S212). Next, the comparison circuit 120 determines the first representative pixel and the second representative pixel according to the maximum distribution range of the distribution ranges. More specifically, the comparison circuit 120 determines the channel corresponding to the largest difference, and takes the two pixels respectively corresponding to the maximum value and the minimum value of the channel as the representative pixels (step S214). After the representative pixels are determined, the calculation circuit 130 generates a plurality of interpolated pixels according to the representative pixels by interpolation (step S220). FIG. 4 shows an exemplary diagram of the representative pixels and the interpolated pixels in the color space. The three axes represent the three channels of the pixels, respectively. Two representative pixels are labeled R0 and R1, and six interpolated pixels are labeled I0~I5. The number of interpolated pixels serves only as an example.

Figure 5:
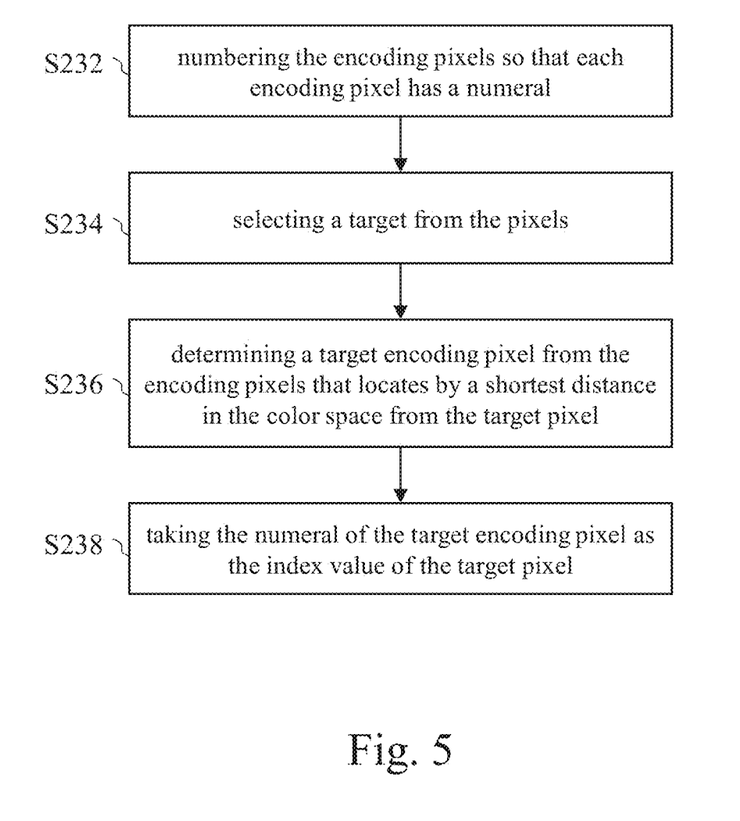
FIG. 5 illustrates a detailed flow of step S230.

Next, the calculation circuit 130 generates an index value for each pixel in the block according to the representative pixels R0, R1 and the interpolated pixels I0~I5 (step S230). More specifically (as shown in the detailed flow of FIG. 5), the calculation circuit 130 first numbers the pixels (including R0, R1 and I0~I5, collectively referred to as encoding pixels), for example, by numbering (R0, I0, I1, I2, I3, I4, I5, R1) as (0, 1, 2, 3, 4, 5, 6, 7) (step S232). A compressing (or encoding) procedure determines an index value for each pixel in the block to replace its pixel value, and the number of bits of the index value is associated with the number of the encoding pixels. For example, each of the index values for eight encoding pixels is $\log_2 8=3$ bits. In contrast, if the number of bits of the index value has been determined (for example, according to the required compression rate), it can be inferred that the number of interpolated pixels required is $2^k-2$ (k is the number of bits of the index value). Next, the calculation circuit 130 takes all the pixels in the block in turn as a target pixel (step S234), and determines, from the encoding pixels, a target encoding pixel that locates by a shortest distance in the color space from the target pixel (step S236), and further takes the numeral of the target encoding pixel as the index value of the target pixel (step S238). More specifically, the calculation circuit 130 calculates the distances between the target pixel and the encoding pixels in the color space formed by the three channels. As shown in FIG. 4, the pixels P0 and P1 are two pixels in the block, assuming that the calculation circuit 130 selects P1 as the target pixel and calculates the respective distances to the eight encoding pixels to learn that the target encoding pixel I1 is the closest pixel, and the calculation circuit 130 can therefore determine that the index value of the target pixel P1 is the numeral of the target encoding pixel I1. Likewise, the calculation circuit 130 determines that the index value of the pixel P0 is the numeral of the encoding pixel I3.

Since the first representative pixel and the second representative pixel are determined according to the channel with the largest distribution range of pixel values, it is possible to encounter the following situation—the color trend of the representative pixel does not match the color trend of all the pixels on the other two channels (reflected in the low frequency component of the block). This situation leads to color shift in encoding process. In other words, if the encoding process is performed according to the channel with the largest difference, the differences among the pixels within the block (reflected in the high frequency component of the block) can be demonstrated, whereas the low frequency component of the encoding pixels may be different from the low frequency component of the original block. In order to solve the problem of color shift, the calculation circuit 130 further adjusts the first representative pixel and the second representative pixel to generate a first adjusted representative pixel and a second adjusted representative pixel (step S240), so that the low-frequency component of the encoded block is consistent with the low-frequency component of the original block. More specifically (as shown in the detailed flow of FIG. 6), the calculation circuit 130 first calculates the average pixel value ($R_{avg}$, $G_{avg}$, $B_{avg}$) of the original block (three channels are separately calculated) (step S242). The calculation circuit 130 then establishes a decoded block according to the first representative pixel, the second representative pixel, and the index values (step S244), and calculates the average pixel value ($R'_{avg}$, $G'_{avg}$, $B'_{avg}$) of the decoded block (Step S246). The calculation circuit 130 then subtracts the average pixel value of the decoded block from the pixel value of the first representative pixel and the pixel value of the second representative pixel to respectively generate a first result and a second result, and adds the average pixel value of the original block to the first result and the second result to respectively generate the first adjusted representative pixel and the second adjusted representative pixel (step S248). In detail, if the pixel value of the first representative pixel R0 is ($R_0$, $G_0$, $B_0$), the pixel value of the first adjusted representative pixel R0' is ($R_0-R'_{avg}+R_{avg}$, $G_0-G'_{avg}$, $B_0-B'_{avg}+B_{avg}$). Calculating the average pixel value of the block herein is one of the embodiments to obtain a low frequency component of the image; other methods that can obtain a low frequency component of the image can be applied to this disclosure.

Figure 7:
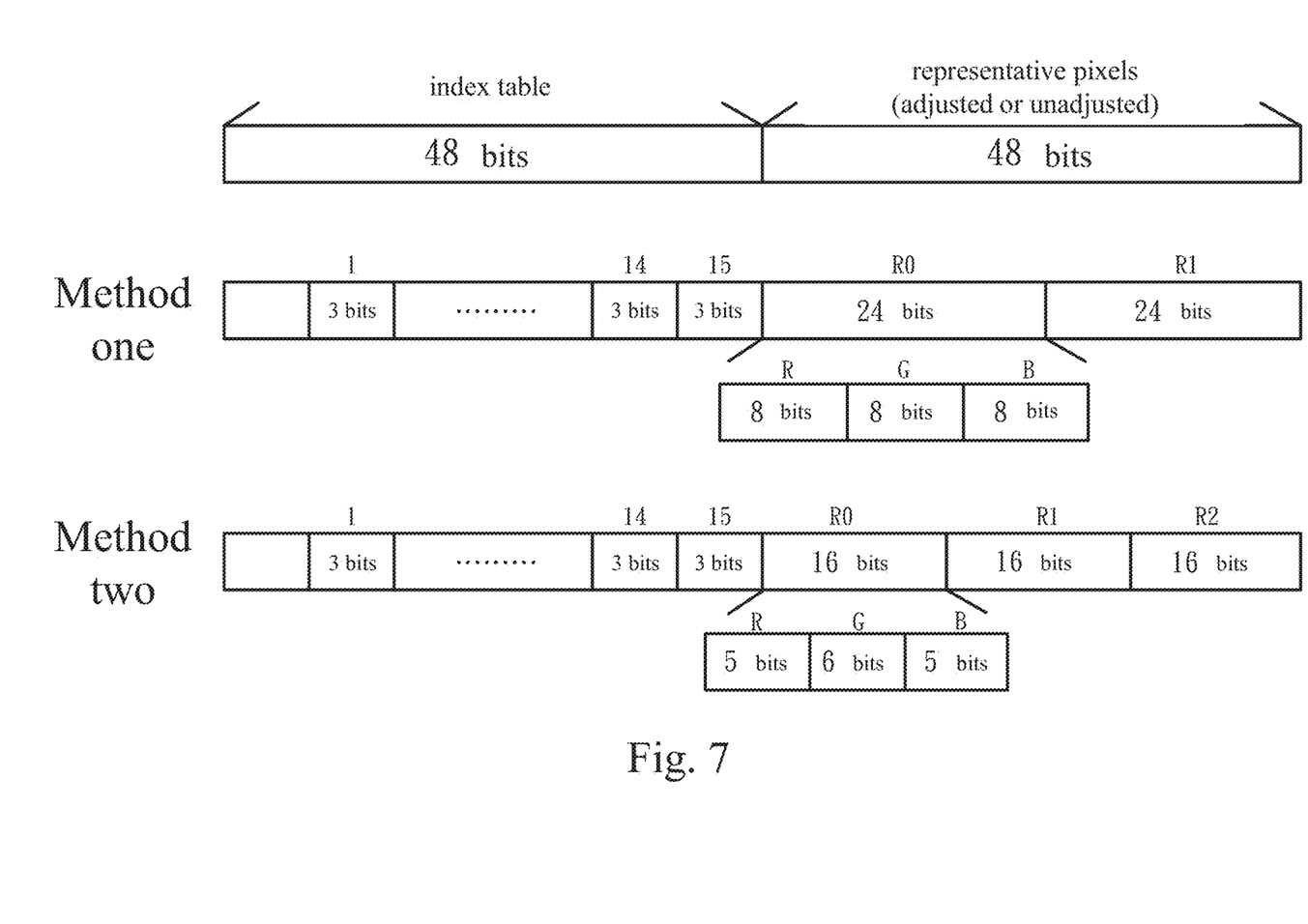
FIG. 7 illustrates an example of a structure of the encoded data.

Next, the calculation circuit 130 stores the complete pixel values or the quantized pixel values of the first adjusted representative pixel R0' and the second adjusted representative pixel R1' together with the index values in the memory 110. The stored data is the compressed data (or the encoded data) of the original block, and may be used to represent the original block (step S250). More specifically, referring to the structure of the encoded data shown in FIG. 7, the data stored in the memory 110 includes an index table and the representative pixels. In this example (corresponding to method one), one block contains 16 pixels and each index value is three bits, and so the size of the index table is 48 bits. When the first adjusted representative pixel R0' and the second adjusted representative pixel R1' are represented by the complete pixel values (assuming that each channel is represented by 8 bits, and therefore the pixel value of one pixel is 8×3=24 bits), the adjusted representative pixels contain a total of 48 bits. In different embodiments, the compression ratio may be increased by sacrificing minor color details, for example, by alternatively representing each of the first adjusted representative pixel R0' and the second adjusted representative pixel R1' by 21 bits (e.g., each of the three channel RGB is reduced by one bit by dropping the lowest bit after quantization). As a result, the encoding of a block is complete. In addition to being stored in the local memory 110, the encoded data may be transmitted to another device (e.g., an image decoder) in a wired or wireless manner.

Figure 8:
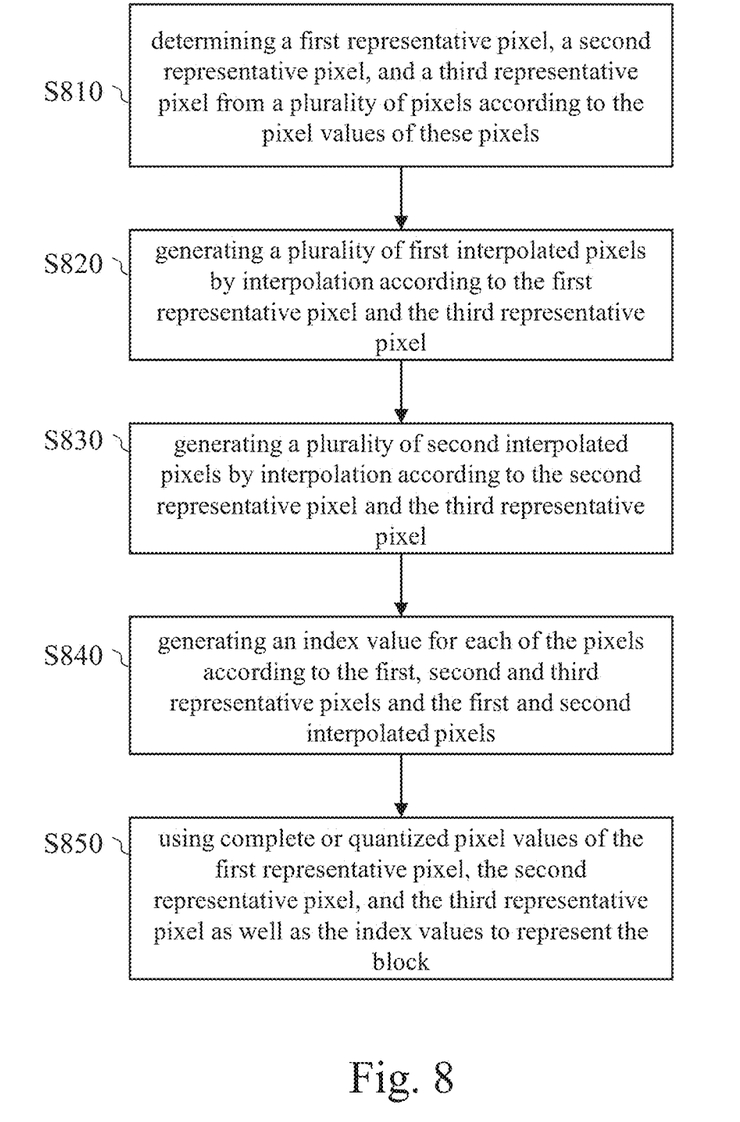
FIG. 8 illustrates a flow chart of a second FLC-based image compression method of this disclosure.
Figure 9:
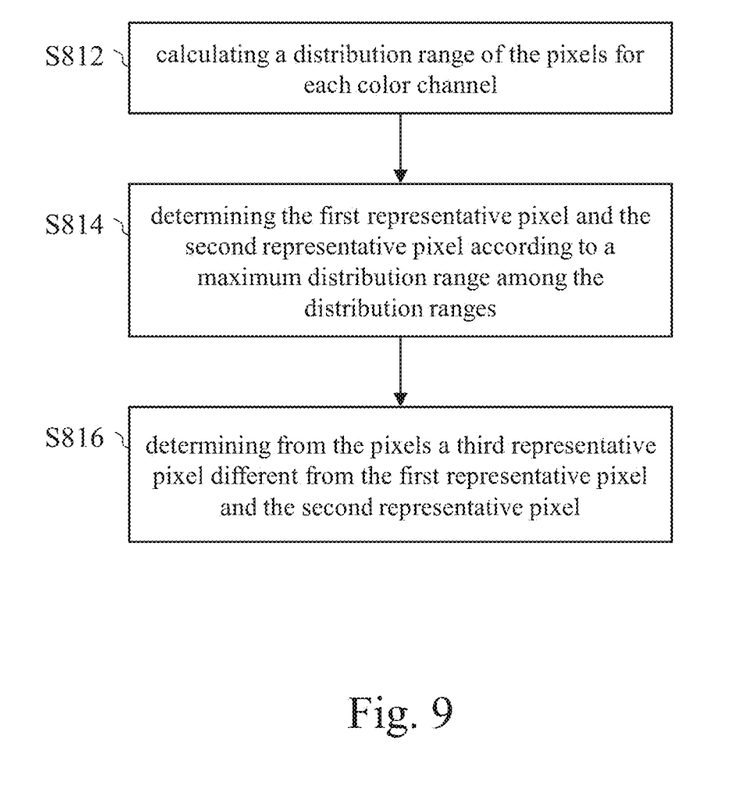
FIG. 9 illustrates a detailed flow of step S810.
Figure 10:
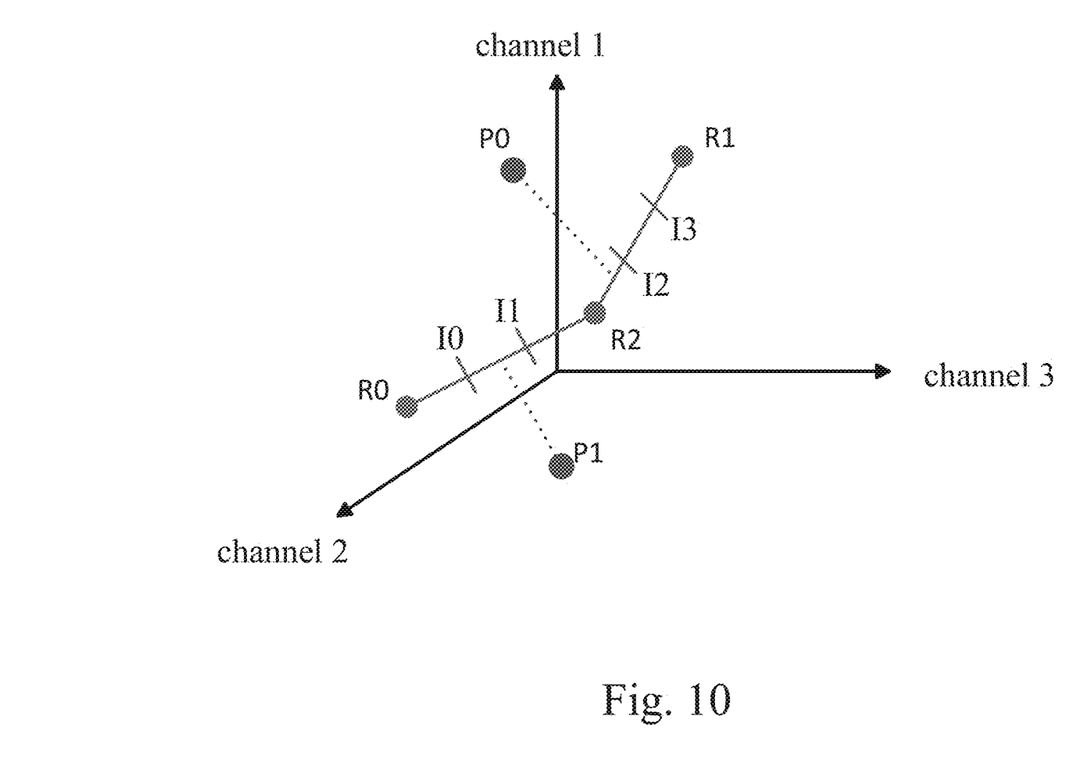
FIG. 10 illustrates an exemplary diagram of the representative pixels and the interpolated pixels in the color space for method two.

FIG. 8 is a flow chart of a second FLC-based image compression method of this disclosure. The comparison circuit 120 reads one block of the image from the memory 110 and determines a first representative pixel, a second representative pixel, and a third representative pixel from a plurality of pixels of the original block according to the pixel values of these pixels. (step S810). More specifically (as shown in the detailed flow of FIG. 9), the comparison circuit 120 performs steps S812 and S814 (the details of which are similar to those of steps S212 and S214 and are thus omitted for brevity) to determine the first representative pixel and the second representative pixel, and then determine, from the pixels, a third representative pixel different from the first representative pixel and the second representative pixel (step S816). More specifically, as shown in FIG. 10, the comparison circuit 120 performs steps S810 and S814 to obtain the first representative pixel R0 and the second representative pixel R1. Next, the comparison circuit 120 compares the distance from each pixel in the color space to the line connecting R0 and R1 and selects the pixel corresponding to the longest distance as the third representative pixel R2. In other words, the area of the triangle formed by the third representative pixel R2 together with the first representative pixel R0 and the second representative pixel R1 in the color space is larger than that of a triangle formed by another pixel together with the first representative pixel R0 and the second representative pixel R1. Therefore, the three representative pixels are not collinear in the color space After obtaining the three representative pixels from the comparison circuit 120, the calculation circuit 130 generates a plurality of first interpolated pixels (e.g., I0, I1) by interpolation according to the first representative pixel R0 and the third representative pixel R2 (step S820), and generates a plurality of second interpolated pixels (e.g., I2, I3) by interpolation according to the second representative pixel R1 and the third representative pixel R2 (step S830). The number of the first interpolated pixels may be the same as the number of the second interpolated pixels (as in the example of FIG. 10) to facilitate the interpolation operation performed by the calculation circuit 130.

Next, the calculation circuit 130 generates an index value for each of the pixels according to the three representative pixels (R0, R1, R2) and the interpolated pixels (I0~I3) (step S840). Since step S840 is similar to step S230, the detailed description is omitted for brevity. Next, the calculation circuit 130 uses the complete pixel values or the quantized pixel values of the first representative pixel R0, the second representative pixel R1, and the third representative pixel R2 as well as the index values to represent the block (step S850). Referring to the data structure corresponding to the method two in FIG. 7, as the encoding method uses three representative pixels, the pixel values of the three representative pixels must be quantized if the same compression ratio as the method one is desired. For example, the pixel value of each of the three representative pixels after quantization is 16 bits (channels R, G, and B are reduced by dropping the lowest three bits, two bits and three bits, respectively).

Figure 6:
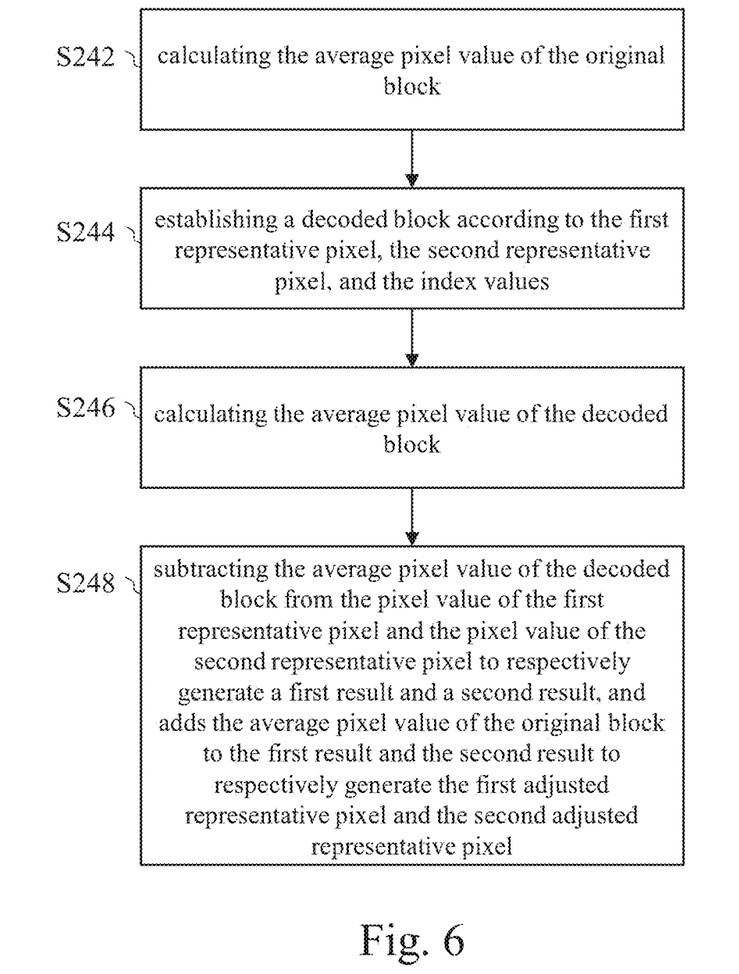
FIG. 6 illustrates a detailed flow of step S240.

In some embodiments, in the method shown in FIG. 8, the first representative pixel and the second representative pixel can be replaced by the first adjusted representative pixel and the second adjusted representative pixel as shown in FIG. 6.

Figure 11:
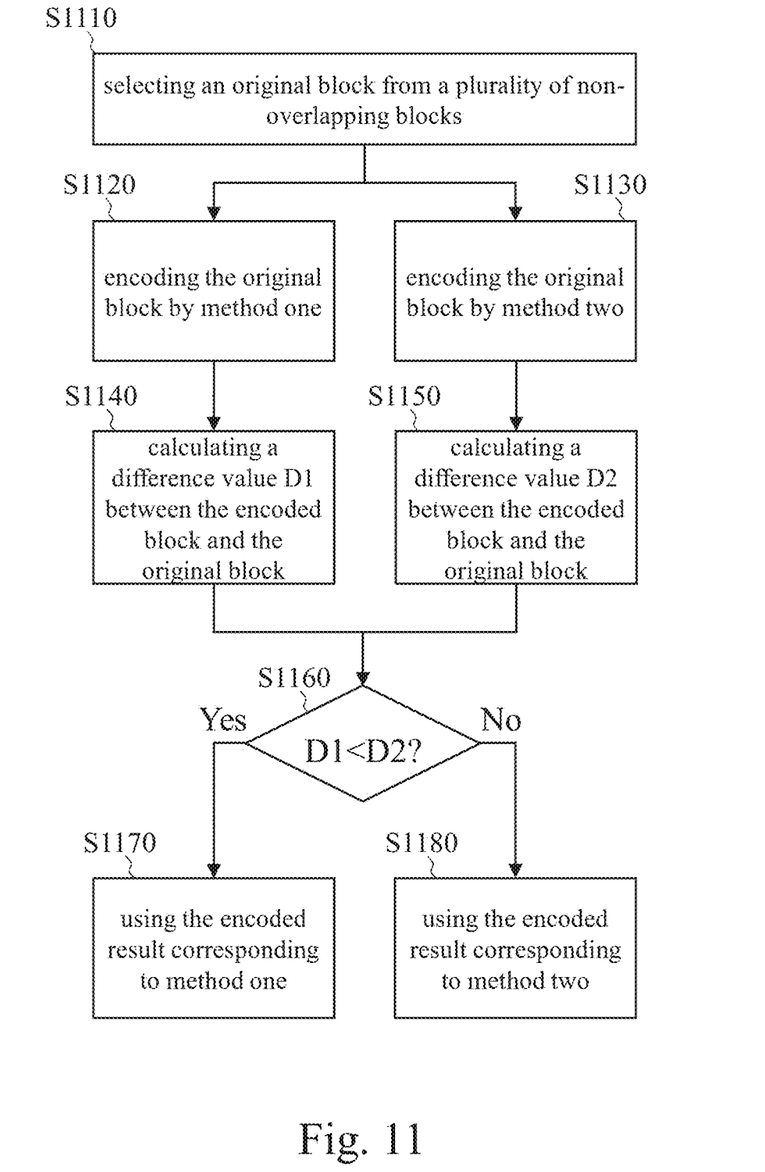
FIG. 11 illustrates a flow chart of the compression method according to another embodiment of this disclosure.

Method two uses a piecewise linear approach to better preserve the edges and colors with large differences within the block, and can preserve a higher degree of image structure trueness than method one. However, under the premise of the same compression rate, method one is more able to show the details of the color than method two. Since the characteristics the blocks are different, that is, method one and method two have their respective suitable applications, this disclosure further proposes a method of selecting one of the two methods by soft decision to conduct image compression. FIG. 11 is a flow chart of the compression method according to another embodiment of this disclosure. At the beginning, the image compression device 100 first selects an original block from a plurality of non-overlapping blocks (step S1110), and then encodes the original block by method one and method two (steps S1120, S1130) to respectively obtain the first encoded data and the second encoded data. Next, the image compression device 100 calculates the difference values D1 and D2 between the encoded block and the original block according to the first and second encoded data, respectively (steps S1140 and S1150). More specifically, the calculation circuit 130 decodes the first encoded data to generate the first decoded block and compares the first decoded block with the original block. For example, the difference D (D1 or D2) can be obtained from equation (1) (which serves merely as an example, not a limitation):

$$D=\Sigma_{i=0}^{l}(R_i-R'_i)^2+(G_i-G'_i)^2+(B_i-B'_i)^2 \qquad (1)$$

In the equation (1), l+1 is the number of pixels of the original block, $(R_1, G_1, B_1)$ are the pixel values of the original block, and $(R'_i, G'_i, B'_i)$ are the pixel values of the decoded block. The comparison circuit 120 then selects an encoding method corresponding to a smaller difference (step S1170 or S1180) according to the values of D1 and D2 (step S1160). Thus, the encoded block can be closer to the original block, hence reducing image distortion.

Note that in the flow of FIG. 11, step S1130 may be performed slightly later than step S1120, for the purpose of approximating the distance required to perform step S816 by the distance calculated in step S236 to reduce the calculation time and the circuit power consumption.

The decoding process corresponding to the encoding method of FIG. 11 can learn whether a block is encoded by method one or method two by checking the range of the index values. More specifically, following the examples of FIG. 4 and FIG. 10, as the range of the index values corresponding to method one and method two are respectively 0~7 and 0~6, the decoding process can learn the encoding method used and how to analyze the encoded data in FIG. 7 (the number of pixels in a block and the number of bits of the index table should be known in advance), and thus the decoding process can be performed according to the index values and the representative pixels.

The compression (encoding) algorithm implemented by the comparison circuit 120 and the calculation circuit 130 of the image compression device 100 may also be performed by a processor (e.g., a central processing unit (CPU), a microprocessor, a digital signal processor, etc.) executing codes or program instructions. The code or program instructions may be stored in the memory 110 or other storage medium.

Since people of ordinary skill in the art can appreciate the implementation detail and the modification thereto of the present method embodiment through the disclosure of the device embodiment, repeated and redundant description is thus omitted. Please note that there is no step sequence limitation for the method embodiments as long as the execution of each step is applicable. Furthermore, the shape, size, and ratio of any element and the step sequence of any flow chart in the disclosed figures are exemplary for understanding, not for limiting the scope of this disclosure. The image compression method of this disclosure can be implemented by software and/or firmware in cooperation with hardware and can be performed by the image compression device disclosed above or its equivalent devices.

The aforementioned descriptions represent merely the preferred embodiments of the present disclosure, without any intention to limit the scope of the present disclosure thereto. Various equivalent changes, alterations, or modifications according to the claims of the present disclosure are all consequently viewed as being embraced by the scope of the present disclosure.

What is claimed is:

1. A fixed length code (FLC)-based image encoding method for encoding a block containing a plurality of pixels, comprising:
   determining a first representative pixel and a second representative pixel from said pixels according to said pixel values of said pixels;
   generating, by interpolation, a plurality of interpolated pixels according to said first representative pixel and said second representative pixel;
   generating an index value for each of said pixels according to said first representative pixel, said second representative pixel, and said interpolated pixels;
   adjusting said first representative pixel and said second representative pixel to generate a first adjusted representative pixel and a second adjusted representative pixel; and
   using said index values and complete or quantized pixel values of said first adjusted representative pixel and said second adjusted representative pixel to represent said block.

2. The image encoding method of claim 1, wherein said pixel value of each pixel corresponds to a plurality of color channels, and said step of determining said first representative pixel and said second representative pixel comprises:
   calculating a plurality of distribution ranges of said pixels in said color channels; and
   determining said first representative pixel and said second representative pixel according to a maximum distribution range of said distribution ranges, wherein said first representative pixel and said second representative pixel respectively comprises a maximum value and a minimum value of a color channel corresponding to said maximum distribution range.

3. The image encoding method of claim 1, wherein said step of adjusting said first representative pixel and said second representative pixel comprises:
   calculating a first average pixel value of said block;
   generating a decoded block according to said first representative pixel, said second representative pixel, and said index values;
   calculating a second average pixel value of said decoded block; and
   subtracting said second average pixel value from a pixel value of said first representative pixel and a pixel value of said second representative pixel and then adding said first average pixel value thereto to respectively generate said first adjusted representative pixel and said second adjusted representative pixel.

4. The image encoding method of claim 1, wherein said first representative pixel, said second representative pixel, and said interpolated pixels constitute a plurality of encoding pixels, and said step of generating said index value for each of said pixels comprises:
   numbering said encoding pixels so that each encoding pixel has a numeral;
   selecting a target pixel from said pixels;
   determining, among said encoding pixels, a target encoding pixel that locates by a shortest distance from said target pixel in a color space to which said pixels correspond; and
   using said numeral of said target encoding pixel as said index value of said target pixel.

5. A fixed length code (FLC)-based image encoding device for encoding a block containing a plurality of pixels, comprising:
   a memory storing a plurality of pixel values of said pixels;
   a comparison circuit, coupled to said memory, and configured to determine a first representative pixel and a second representative pixel from said pixels according to said pixel values of said pixels,
   a calculation circuit, coupled to said memory and said comparison circuit, for performing steps of:
      generating, by interpolation, a plurality of interpolated pixels according to said first representative pixel and said second representative pixel;
      generating an index value for each of said pixels according to said first representative pixel, said second representative pixel, and said interpolated pixels;
      adjusting said first representative pixel and said second representative pixel to generate a first adjusted representative pixel and a second adjusted representative pixel; and
      using said index values and complete pixel values or quantized pixel values of said first adjusted representative pixel and said second adjusted representative pixel to represent said block.

6. The image encoding device of claim 5, wherein said pixel value of each pixel corresponds to a plurality of color channels, and said comparison circuit is further configured to calculate a plurality of distribution ranges of said pixels in said color channels and to determine said first representative pixel and said second representative pixel according to a maximum distribution range of said distribution ranges, wherein said first representative pixel and said second representative pixel respectively comprises a maximum value and a minimum value of a color channel corresponding to said maximum distribution range.

7. The image encoding device of claim 5, wherein said step of adjusting said first representative pixel and said second representative pixel comprises:
   calculating a first average pixel value of said block;
   generating a decoded block according to said first representative pixel, said second representative pixel, and said index values;
   calculating a second average pixel value of said decoded block; and
   subtracting said second average pixel value from a pixel value of said first representative pixel and a pixel value of said second representative pixel and then adding said first average pixel value thereto to respectively generate said first adjusted representative pixel and said second adjusted representative pixel.

8. The image encoding device of claim 5, wherein said first representative pixel, said second representative pixel, and said interpolated pixels constitute a plurality of encoding pixels, and said step of generating said index value for each of said pixels comprises:
numbering said encoding pixels so that each encoding pixel has a numeral;
selecting a target pixel from said pixels;
determining, among said encoding pixels, a target encoding pixel that locates by a shortest distance from said target pixel in a color space to which said pixels correspond; and
using said numeral of said target encoding pixel as said index value of said target pixel.

9. A fixed length code (FLC)-based image encoding device for encoding a block containing a plurality of pixels, comprising:
a memory storing a plurality of pixel values of said pixels;
a comparison circuit, coupled to said memory, and configured to determine a first representative pixel and a second representative pixel from said pixels according to said pixel values of said pixels,
a calculation circuit, coupled to said memory and said comparison circuit, for performing steps of:
generating, by interpolation, a plurality of interpolated pixels according to said first representative pixel and said second representative pixel;
generating an index value for each of said pixels, each index value corresponding to one of said first representative pixel, said second representative pixel, and said interpolated pixels;
adjusting said first representative pixel and said second representative pixel to generate a first adjusted representative pixel and a second adjusted representative pixel; and
using said index values and complete pixel values or quantized pixel values of said first adjusted representative pixel and said second adjusted representative pixel to represent said block.

10. The image encoding device of claim 9, wherein said pixel value of each pixel corresponds to a plurality of color channels, and said comparison circuit is further configured to calculate a plurality of distribution ranges of said pixels in said color channels and to determine said first representative pixel and said second representative pixel according to a maximum distribution range of said distribution ranges, wherein said first representative pixel and said second representative pixel respectively comprises a maximum value and a minimum value of a color channel corresponding to said maximum distribution range.

11. The image encoding device of claim 9, wherein said step of adjusting said first representative pixel and said second representative pixel comprises:
calculating a first average pixel value of said block;
generating a decoded block according to said first representative pixel, said second representative pixel, and said index values;
calculating a second average pixel value of said decoded block; and
subtracting said second average pixel value from a pixel value of said first representative pixel and a pixel value of said second representative pixel and then adding said first average pixel value thereto to respectively generate said first adjusted representative pixel and said second adjusted representative pixel.

12. The image encoding device of claim 9, wherein said first representative pixel, said second representative pixel, and said interpolated pixels constitute a plurality of encoding pixels, and said step of generating said index value for each of said pixels comprises:
numbering said encoding pixels so that each encoding pixel has a numeral;
selecting a target pixel from said pixels;
determining, among said encoding pixels, a target encoding pixel that locates by a shortest distance from said target pixel in a color space to which said pixels correspond; and
using said numeral of said target encoding pixel as said index value of said target pixel.

* * * * *